United States Patent [19]

Geddes

[11] Patent Number: 5,060,271
[45] Date of Patent: Oct. 22, 1991

[54] ACTIVE MUFFLER WITH DYNAMIC TUNING

[75] Inventor: Earl R. Geddes, Livonia, Mich.

[73] Assignee: Ford Motor Company, Dearborn, Mich.

[21] Appl. No.: 519,389

[22] Filed: May 4, 1990

[51] Int. Cl.⁵ .............................................. G10K 11/16
[52] U.S. Cl. ........................................ 381/71; 181/206
[58] Field of Search ................... 381/71; 181/206, 207

[56] References Cited

U.S. PATENT DOCUMENTS

| | | |
|---|---|---|
| 4,153,815 | 5/1979 | Chaplin et al. . |
| 4,473,906 | 9/1984 | Warnaka et al. ...................... 381/71 |
| 4,480,333 | 10/1984 | Ross ...................................... 381/71 |
| 4,669,122 | 5/1987 | Swinbanks ............................ 381/71 |
| 4,677,676 | 6/1987 | Eriksson ................................ 381/71 |
| 4,677,677 | 6/1987 | Eriksson ................................ 381/71 |
| 4,736,431 | 4/1988 | Allie et al. ............................ 381/71 |
| 4,783,817 | 11/1988 | Hamada et al. ...................... 381/71 |
| 4,805,733 | 2/1989 | Kato et al. ............................ 381/71 |
| 4,815,139 | 3/1989 | Eriksson et al. ...................... 381/71 |
| 4,837,834 | 6/1989 | Allie ...................................... 381/71 |
| 4,876,722 | 10/1989 | Dekker et al. ........................ 381/71 |
| 4,878,188 | 10/1989 | Ziegler, Jr. . |

FOREIGN PATENT DOCUMENTS 2191063A 2/1987 United Kingdom .

Primary Examiner—Forester W. Isen
Assistant Examiner—Sylvia Chen
Attorney, Agent, or Firm—Mark L. Mollon; Roger L. May

[57] ABSTRACT

A method and apparatus for muffling motor vehicle engine noise comprises conventional noise attenuation apparatus and techniques as well as a tuning circuit for delivering separate signal outputs to at least two transducers separated along the length of the exhaust conduit. A spacing between the transducers corresponds to the range of tuned exhaust lengths required at various engine speeds within the operating range of the motor vehicle engine. The tuning circuit varies the strength of the signal delivered to each of the transducers to vary the cancellation point within the conduit so as to vary the effective length of the conduit in a manner that maintains a minimum or negative pressure pulse at the valve exhaust port and aids in the exhaustion of combustion gases from the cylinder. As a result, engine performance is improved throughout the operating range of the motor vehicle engine.

7 Claims, 2 Drawing Sheets

ACTIVE MUFFLER WITH DYNAMIC TUNING

TECHNICAL FIELD

The present invention relates generally to noise reduction apparatus and more particularly to active sound cancellation applied to motor vehicle exhaust conduits.

BACKGROUND ART

In the operation of internal combustion engines, the opening of exhaust valves releases the expanding combustion products from the engine cylinder into an exhaust conduit. Since the combustion generates a substantial amount of noise, the repeated opening and closing of the valves induces a sound pressure pulse train through the conduit. Conventionally, the noise generated is suppressed by a passive muffler system in which the sound waves are broken up by baffles, passageways and the like or absorbed in a sound-deadening material. However, such devices and techniques for reducing the sound level also obstruct the free flow of exhaust gases through the exhaust conduits. As a result, such mufflers interfere with efficient operation of the vehicle engine.

Even where such mufflers have not been used for the sake of performance, the length of the conduit has been found to play an important role in engine operating efficiency. For example, in a multi-cylinder engine, an exhaust conduit for each of the cylinders may be coupled to a common collector. The length of each of the exhaust pipes leading to the collector be determined so that pulses reaching the collector do not induce a reactive pulse of improper phase within a conduit for another cylinder which could interfere with the release of the exhaust gases from that conduit. If positive pressure pulses arrive at the valve port for the other cylinder when the valve is open, they can impede efficient release of the exhaust gases. Conversely, a negative pressure pulse at the valve port when the valve is opened aids in the extraction of exhaust gases from the cylinder.

The timed arrival of the pulses is related to the frequency of the pulse train and the length of the conduit. Consequently, a fixed length of pipe will provide optimum performance at substantially a single engine rpm and the advantage diminishes within a small range of engine rpm. Thus, the fixed length is often selected to provide optimum performance at an engine speed providing maximum torque. For example, the engine speed chosen may be related to the shift point for changing gears in the transmission.

In exhaust systems where a single exhaust conduit is provided for each exhaust port, the release of the pulse train at the end of the conduit can induce a negative standing wave reaction which must be timed to arrive at the valve port so that it enhances rather than obstructs the release of combustion gases from the cylinder through the exhaust port. Again, since the arrival time of the pulse is dependent upon the frequency of the pulse and the length of the conduit through which it travels, it will be understood that the optimum performance of a fixed length conduit is limited to a particular engine rpm, and the efficiency decreases outside of a small range.

It is expected that similar phenomena will be encountered in the application of noise attenuation techniques in active muffler systems. In particular, the introduction of cancellation pulses to counteract generated pulses within an exhaust conduit does not actually eliminate the energy of the pulses which cancel each other. Rather, a significant portion of the energy not removed as heat forms a standing wave transmitted toward the source of the sound pressure pulses at the valve port. Accordingly, proper timing of the reaction pulses so that the reaction waves produce a negative pressure when the exhaust valve is opened would enhance extraction of the combustion gases from the cylinder. Proper timing of this effect depends upon the position at which the cancellation signals are introduced.

However, the transducers of previously known noise cancellation systems are fixedly positioned with respect to the conduits in which they act. Although the previously known electronic controls include adaptive filters for adjusting to the changing sound pressure pulse frequencies, they do not affect the reaction wave phenomena discussed above. Moreover, since the exhaust pipes have a fixed length, any reactive waves induced would provide enhanced cylinder evacuation results only at or very close to a single predetermined frequency.

U.S. Pat. No. 4,473,906 to Warnaka et al discloses numerous prior art sound attenuation system embodiments. The patent discusses the inclusion of additional transducers and electronic controls to improve the performance of the active acoustic attenuator, by reducing the effect of the feedback of the cancellation signal which arrives at the sensor.

U.S. Pat. No. 4,677,677 to Eriksson further improves attenuation by including an adaptive filter with on-line modeling of the error path and the cancelling speaker by using a recursive algorithm without dedicated off-line pretraining. U.S. Pat. No. 4,677,676 adds a low amplitude, uncorrelated random noise source to a system to improve performance. Likewise, U.S. Pat. Nos. 4,876,722 to Decker et al discloses transducer placement at the transverse center of a duct. U.S. Pat. No. 4,783,817 to Hamada et al discloses transfer functions for adaptive filters where the cancellation transducers are positioned between sensing microphones spaced along a duct. These patents do not disclose adaptations of active attenuator noise control systems to motor vehicles, nor do they teach that such noise control can improve motor vehicle engine performance.

SUMMARY OF THE PRESENT INVENTION

The present invention overcomes the above mentioned disadvantages by providing an active muffler using a noise attenuation system which improves the performance of the engine as well as reducing the noise emanated from the engine without imposing passive restrictions within the exhaust conduit. In general, the muffler comprises an active noise cancellation system with at least two transducers which are longitudinally spaced apart from each other at predetermined locations along the length of the conduit. An electronic control generates a signal in a conventional manner for driving each transducer and generating a pulse train which cancels the pulse train passing through the conduit at a respective predetermined location. In addition to the conventional adaptive filter circuitry, the electronic control includes means for variably driving the spaced apart transducers so that the effective cancellation point varies upstream of the first and second predetermined locations of the transducers as a function of the frequency of the pulse passing through the conduit. As a result, the effective length of the conduit for the purpose of tuning the conduit changes, assuring that negative pressure reaction pulses arrive at the valve port when the valve is opened to aid in the extraction of combustion gases from the engine cylinder as in previously known tuned exhaust systems, but throughout the entire range of engine speeds.

In the preferred embodiment, the electronic control generates signals to each of the cancellation transducers where each signal amplitude is adjusted with respect to the other so that addition of the pulses generated by the transducers cancels out the sound pressure pulses travelling through the conduit downstream of the cancelling transducers. In addition, a minimal or negative pressure is timed to arrive at the upstream valve port as the valve opens.

The position of the transducers is spaced from the valve a distance as large as possible to avoid harsh temperature conditions, and is spaced from the input sensor to provide a sufficient amount of processing time for the transducers' driver. The distance between the transducers is then related to the wavelengths of the highest and lowest frequencies to be encountered. Preferably, the distance between the transducers is greater than one-sixteenth of the wavelength of the highest frequency, i.e. the shortest wavelength, and less than one-fourth the wavelength of the lowest frequency, i.e. the longest wavelength, so that the effective, tuned length of the conduit remains upstream of the transducers.

The effective length of the conduit is adjusted as necessary by a tuning circuit to provide a minimal or negative standing wave pulse at the valved port throughout the range of engine speeds. At a first selected frequency related to engine speed, such as the frequency of valve opening at normal idle engine speed can be determined by the conventional ranges of engine speeds and related frequencies of valve operation. The second predetermined frequency is related to operation of the valve at a second predetermined engine speed, such as the engine speed at which gear shifts will occur, to assure that the reaction pulse arrives at the valve to minimize interference with or cooperate with exhaustion of the combustion gases from the cylinder when the valve is open.

In such an embodiment, the first and second transducers will be proportionally activated to cancel the sound pressure pulses downstream when the engine is operating. At a low engine speed, for example, idle speed, the cancellation signal generated in the conduit by adding the output of the transducers will generate an upstream standing wave acting as though the conduit has an effective length approaching toward the transducer locations. At higher engine speeds, the sum of the transducer outputs and the input pulse train generates an upstream standing wave acting as though the conduit has an effective length closer to the sound pressure source.

At intermediate engine speeds, the electronic control varies the amplitude of the signal delivered to each of the transducers so that they cooperate in cancelling sound pressure pulses related to intermediate engine speeds. Such cooperation provides an effective conduit length upstream of the transducer positions that correspond to the pulse frequency, and thus the engine speed. Therefore, the system dynamically tunes the exhaust for maximum efficiency throughout a wide range of speeds.

Thus, the present invention provides active attenuation of sound pressure pulses passing through an exhaust conduit of a motor vehicle which avoids obstruction of the exhaust gases through the passageway. More importantly, the exhaust conduit can be dynamically tuned throughout a wide range of engine speeds to enhance performance of the engine throughout the engine speed range.

BRIEF DESCRIPTION OF THE DRAWING

The present invention will be more clearly understood by reference to the following detailed description in which like reference characters refer to like parts throughout the views and in which.

BEST MODE FOR CARRYING OUT THE INVENTION

Figure 1:
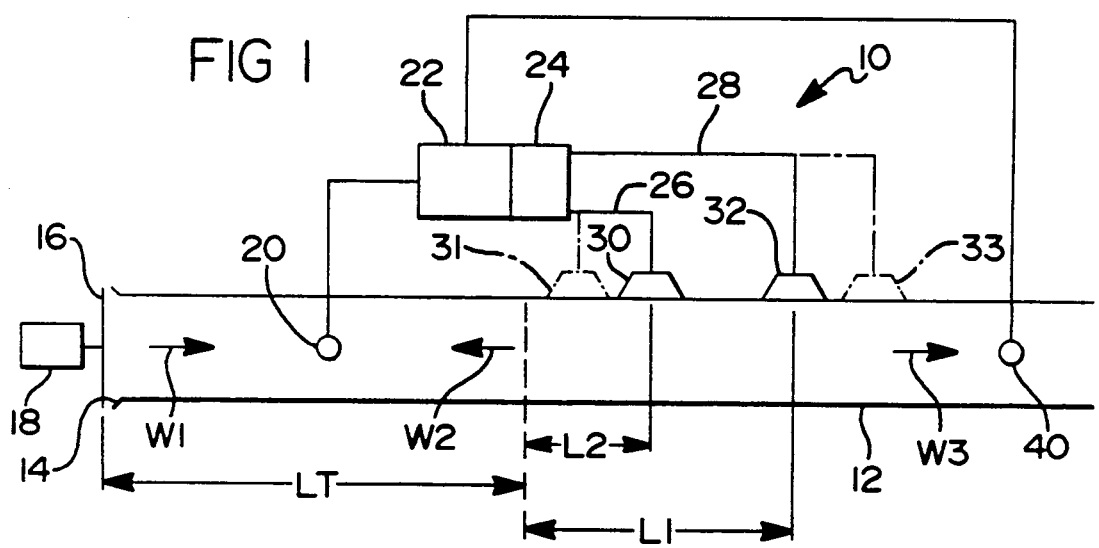
FIG. 1 is a diagrammatic representation of an active muffler constructed in accordance with the present invention.

Referring first to FIG. 1, the noise attenuation system 10 is thereshown diagrammatically incorporated with an exhaust conduit 12 of a motor vehicle. One end 14 of the conduit 12 includes a port which is opened and closed by a valve 16 by appropriate means 18 such as a conventional, engine driven, valve lifter mechanism.

As in previously known active cancellation systems, the noise attenuation system 10 includes a microphone 20 for sensing sound pressure pulses passing through the conduit 12 in response to repeated opening of the valve 16 during operation of the engine. The microphone 20 delivers signals to an electronic control 22 to produce signals with an appropriate wavelength for driving a transducer to cancel pulses downstream of the microphone 20.

However, the system 10 also includes a tuning circuit 24 to provide separate outputs 26 and 28 to two transducers 30 and 32, respectively. The transducer 32 is positioned in a first predetermined position along the length of conduit 12 as indicated in FIG. 1 at a distance L1 from LT. This position may be dictated by packaging requirements, but preferably, this position is spaced apart from the valve to avoid the extreme environmental conditions at the valve. This location is defined in the present disclosure in terms of its distance from a desired effective exhaust conduit length LT upstream of the transducers 30 and 32.

The second transducer 30 is positioned at a second predetermined position along the length of the conduit 12 as designated in FIG. 1 at a distance L2 from LT. The distance between the positions of the transducers, i.e. L1–L2 is preferably greater than one-sixteenth of the wavelength of the highest frequency and less than one-fourth the wavelength the lowest frequency. The distance LT is representative of the conduit location at which the introduction of cancellation signals creates an effective reaction wave timed to introduce a minimal or even a negative pressure pulse at the port 14 when the valve 16 is opened during engine operation. Preferably, the engine speed range will be selected to include the idle speed and maximum torque speeds of the engines, and the frequency range of valve operation is determined from those speeds.

Figure 3:
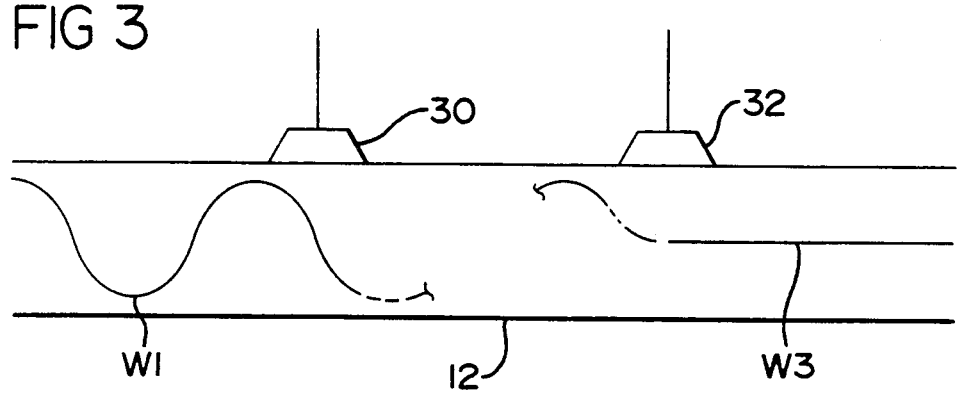
FIG. 3 is a diagrammatical representation of waveform comparisons representative of the operation of the system shown in FIG. 1.
Figure 4:
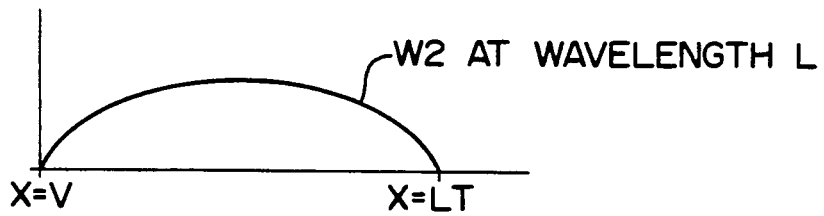
FIG. 4 is a graphical representation of tuned exhaust conduit performance according to the present invention at a fixed engine speed.
Figure 5:
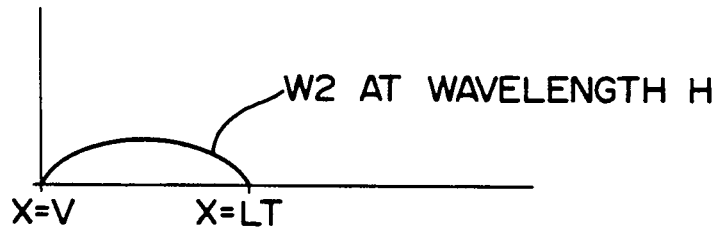
FIG. 5 is a graphical representation similar to FIG. 4 but representing performance at higher engine speed.

The tuning circuit 24 provides a signal through outputs 26 and 28 in response to the electronic control 22 to produce signals at transducers 30 and 32 which will cancel out the sound pressure pulses downstream of the transducers resulting in a waveform W3 shown diagrammatically in FIG. 3. In addition, the tuning circuit 24 of the present invention drives the transducers 30 and 32 to generate a standing wave W2, represented in FIGS. 4 and 5, upstream of the transducers 30 and 32. The standing wave W2 has a wavelength that varies between wavelength L for the wavelength of the lowest frequency pulse train encountered and wavelength H for the highest frequency pulse train encountered. W2 is effective from a point LT which varies as a function of the relative amplitudes of the signals generated at transducers 30 and 32.

As an example of the operation of tuning circuit 24, the input signal W1 may be represented as a signal $Ae^{iwt-ikx}$, where k is equal to w/c and where w is equal to $2\pi$ f and c equals the speed of sound. In a prior art single transducer noise cancellation system, the cancellation signal would be $Be^{iwt}$ where B is about equal to $-2A$. In the present invention, signal $Be^{iwt}$ and $Ce^{iwt}$ are introduced at $X=L2$ and $X=L1$ respectively. Thus, at the conduit regions downstream of transducers 30 and 32, the sum of $Be^{iwt-ik(LT-L2)} + Ce^{iwt-ik(LT-L1)} + Ae^{iwt-ikx}$ is made equal to 0, whereby $Be^{ik(L2)} + Ce^{ik(L1)} + A = 0$. In regions upstream of transducers 30 and 32, $$Be^{iwt+ik(LT-L2)} + Ce^{iwt+ik(LT-L1)} + Ae^{iwt-ikx} = W2,$$

whereby $$Be^{-ik(L2)} + Ce^{-ik(L1)}A = 0 @ x = LT.$$

Therefore, C and B may be resolved in terms of A and it is found that $$C = \{SIN(K(L2))/SIN[K(L1-L2)]\}A, \text{ and}$$

$$B = \{-SIN(K(L1))/SIN[K(L1-L2)]\}A.$$

Accordingly, the tuning circuit 24, such as a microprocessor programmed to function in accordance with this algorithm serves to drive transducers 30 and 32 as required to vary $X=LT$ as necessary to maximize engine efficiency.

The engine speed at a first level R1 may be a minimum engine speed, and is preferably selected as the idle speed of the engine. Conversely, the tuning circuit 24 also generates a signal at outputs 26 and 28 to drive the transducers 30 and 32 as required to cancel sound pressure pulses detected at microphone 20 at the upper end of the operating speed range of the vehicle engine. At intermediate speeds within the operating range, the signals sent through outputs 28 and 26 will vary relative to each other in response to the frequency detected. Thus, outputs 28 and 26 will vary the effective cancellation point LT at a position upstream of the transducers along the conduit 12.

Figure 2:
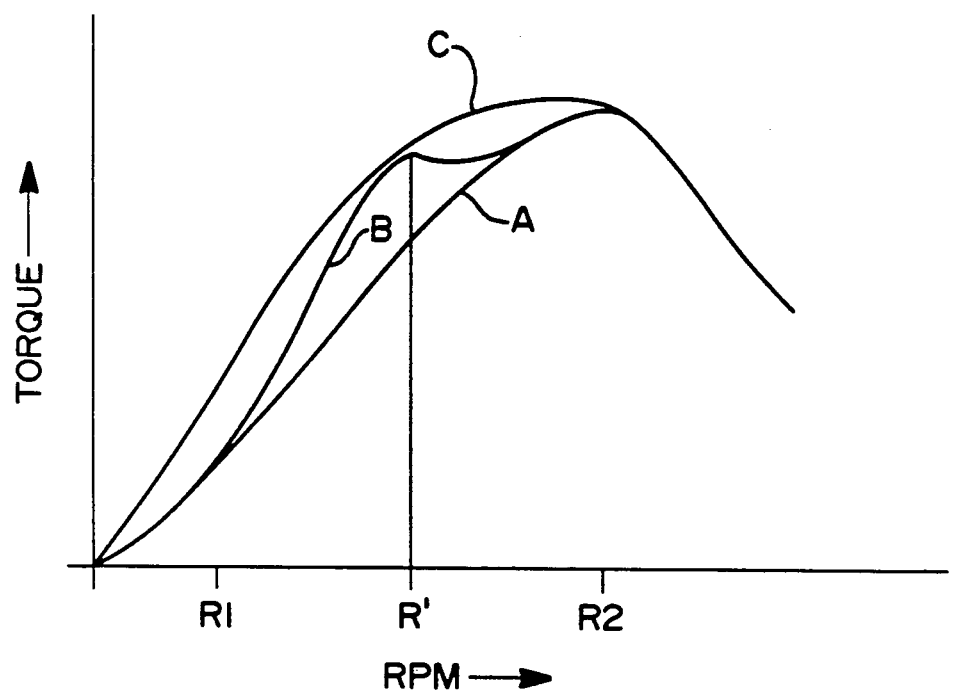
FIG. 2 is a graphical illustration of the performance of the system shown in FIG. 1 in comparison with previously known performance characteristics.

The operation of the device is best shown with reference to FIG. 2 in which torque is shown as a function of engine speed. Line A represents the typical performance characteristic of an engine which is subject to normal operating inefficiencies such as those caused by exhaust restrictions. As represented by Line B, the previously known tuned exhaust system enables greater torque to be obtained over a range of engine speeds by terminating the exhaust conduit 12 at a distance LT at which the reactionary waveform delivers minimal or negative pressure to the port 14 when the valve 16 is open. It will be appreciated that the increased efficiency of the engine tapers off dramatically above and below the engine speed relating to the frequency of valve operation for which the conduit 12 is tuned. With the present invention, the combination of the tuning circuit 24 and the spaced transducers 32 and 30 provides a varying point of sound pressure cancellation within the conduit 12. Consequently, the evacuation effect of minimal or induced negative pressure at the valve 16 can be employed throughout a desired engine speed range as shown by line C.

As a result, the system 10 of the present invention not only reduces noise by cancelling the sound pressure pulses travelling through the exhaust conduit 12, but at the same time, produces a reactionary pulse effect which tends to increase the efficiency of engine operation. As a result, the system optimizes engine efficiency throughout its operating range.

Having thus described the present invention, many modifications thereto will become apparent to those skilled in the art to which it pertains without departing from the scope and spirit of the present invention as defined in the appended claims.

I claim:

1. A dynamically tuned exhaust system for a motor vehicle exhaust conduit having an inlet and an outlet, said system comprising:
   a sensor for generating a signal representative of sound pressure pulses from a source through a conduit;
   a first transducer fixed at a first position along said conduit;
   a second transducer fixed at a second position spaced from said first position;
   an electronic controller for selectively driving said first and second transducers in response to said sensor signal and producing an output pulse having a phase opposite to said sound pressure pulse at said first and second positions, and including means for variably driving said first transducer and second transducer to control the effective cancellation point along said conduit as the frequency of said sound pressure pulses changes with engine speed by inducing a minimum pressure at the conduit inlet throughout the engine speed range.

2. The invention as defined in claim 1 wherein said means for variably driving comprises means for proportionally varying the amplitude of the signals delivered to said first and second transducers.

3. The invention as defined in claim 1 wherein said means for variably driving comprises means for simulating a standing wave generated in a tuned exhaust conduit.

4. The invention as defined in claim 3 wherein said effective cancellation point is upstream of said first and second transducers.

5. The invention as defined in claim 1 wherein the source is a motor vehicle engine.

6. A method for dynamically tuning a motor vehicle exhaust conduit with an active attenuation system for sound pressure pulses, said conduit having an inlet and an outlet comprising:

actively attenuating said sound pressure pulses by generating a cancellation signal at a first effective conduit location along said conduit for a first predetermined sound frequency of said sound pressure pulses corresponding to a first engine RPM limit;

actively attenuating said sound pressure pulses by generating a cancellation signal at a second effective conduit location for a second predetermined sound frequency of said sound pressure pulses corresponding to a second engine RPM limit; and actively attenuating said sound pressure pulses by controlling the effective conduit location between said first and second effective conduit locations by generating a first proportional cancellation signal at a first transducer location, and a second proportional cancellation signal at a second transducer location when said sound pressure pulses are at sound frequencies intermediate said first predetermined sound frequency and said second predetermined sound frequency, to induce a minimum pressure at the conduit inlet throughout the engine RPM range.

7. A method for dynamically tuning a combustion engine exhaust conduit comprising:

positioning first and second transducers downstream of a sound pressure input at a distance $L2-L1$ from each other, where $L2-L1$ is greater than one-sixteenth of the wavelength of a highest frequency of sound pressure related to engine speed and less than one-fourth the wavelength of a lowest frequency, where L2 is of sound pressure related to engine speed distance beyond a variable distance LT from the sound pressure input a upstream of said first transducer and L1 is the distance beyond said distance LT from the sound pressure input to said second transducer;

variably driving said first and second transducers with an active attenuation signal proportional to the amplitude of the sound pressure input to cancel the sound pressure pulses downstream of said transducers and tuning said signal to control distance LT as a function of engine speed to induce a minimum pressure pulse in a standing wave induced upstream of said transducers.

* * * * *

UNITED STATES PATENT AND TRADEMARK OFFICE
CERTIFICATE OF CORRECTION

PATENT NO. : 5,060,271
DATED : October 22, 1991
INVENTOR(S) : Earl R. Geddes

It is certified that error appears in the above-identified patent and that said Letters Patent is hereby corrected as shown below:

Column 1, line 30, after "collector" insert --will--.

Column 5, lines 28-29, after "the sum of" the formula should read as follows:
$$Be^{iwt-ik(LT-L2)} + Ce^{iwt-ik(LT-L1)} + Ae^{iwt-ikx}$$

Column 5, lines 29-30, after "whereby", the formula should read as follows:
$$Be^{ik(L2)} + Ce^{ik(L1)} + A = 0$$

Column 5, line 36, the formula should read as follows:
$$Be^{-ik(L2)} + Ce^{-ik(L1)} + A = 0 \ @ \ x = LT$$

Column 8, lines 9-11 (Claim 7), after "frequency" delete ", where L2 is of sound pressure related to engine speed distance beyond a variable distance LT from the sound pressure input a" and insert in place thereof --of sound pressure related to engine speed, where L2 is a distance beyond a variable distance LT from the sound pressure input--.

Signed and Sealed this

Sixth Day of April, 1993

*Attest:*

STEPHEN G. KUNIN

*Attesting Officer*  *Acting Commissioner of Patents and Trademarks*